United States Patent
Johnson et al.

(10) Patent No.: US 6,475,329 B1
(45) Date of Patent: Nov. 5, 2002

(54) PRIMER FOR SILICONE COMPOSITIONS

(75) Inventors: Claude Daniel Johnson, Cary, NC (US); Eileen Marie Hawkins, Fuquay-Varina, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/411,874

(22) Filed: Oct. 4, 1999

(51) Int. Cl.[7] .................................................. C09J 5/02
(52) U.S. Cl. .............................. 156/307.5; 106/287.11; 156/326
(58) Field of Search ............................ 156/307.5, 326; 106/287.11

(56) References Cited

U.S. PATENT DOCUMENTS

| | | |
|---|---|---|
| 3,020,260 A | 2/1962 | Nelson |
| 3,772,122 A | 11/1973 | Young |
| 4,141,751 A | 2/1979 | Moreland |
| 4,228,221 A | 10/1980 | Rohowetz |
| 4,281,037 A | 7/1981 | Choung |
| 4,332,844 A | 6/1982 | Hamada et al. |
| 4,356,233 A | 10/1982 | Lange et al. |
| 4,415,156 A | 11/1983 | Jorgensen |
| 4,436,787 A | 3/1984 | Mikami et al. |
| 4,600,261 A | 7/1986 | Debbaut |
| 4,634,207 A | 1/1987 | Debbaut |
| 4,643,924 A | 2/1987 | Uken et al. |
| 4,654,236 A | 3/1987 | Finzel |
| 4,662,692 A | 5/1987 | Uken et al. |
| 4,681,636 A * | 7/1987 | Saito et al. .................. 156/326 |
| 4,749,741 A * | 6/1988 | Saito et al. ............. 106/287.19 |
| 4,777,063 A | 10/1988 | Dubrow et al. |
| 4,808,483 A | 2/1989 | Nakasuji et al. |
| 4,846,721 A | 7/1989 | Debruycker et al. |
| 5,053,081 A * | 10/1991 | Jacob ..................... 106/287.11 |
| 5,069,636 A | 12/1991 | Shimirak et al. |
| 5,079,300 A | 1/1992 | Dubrow et al. |
| 5,153,988 A | 10/1992 | Mattis et al. |
| 5,167,526 A | 12/1992 | Pinyan et al. |
| 5,273,449 A | 12/1993 | Mattis et al. |
| 5,347,084 A | 9/1994 | Roney et al. |
| 5,357,057 A | 10/1994 | Debbaut |
| 5,449,299 A | 9/1995 | Shimirak et al. |
| 5,601,460 A | 2/1997 | Shimirak et al. |
| 5,807,430 A * | 9/1998 | Zheng et al. ........... 106/287.11 |
| 5,828,005 A | 10/1998 | Huynh-Ba et al. |

* cited by examiner

*Primary Examiner*—John J. Gallagher

(57) ABSTRACT

A combination of a specific first coupling agent, second coupling agent, and carrier solvent is synergistically effective as a primer for improving the adhesion of silicone compositions, especially hydrosilation cured silicone gels, to polymer surfaces. The first coupling agent is a titanium-, boron-, or zirconium-containing coupling agent, or a combination of such. The second coupling agent is a silane coupling agent.

15 Claims, No Drawings

PRIMER FOR SILICONE COMPOSITIONS

BACKGROUND OF THE INVENTION

1. Field of the Invention

This invention relates to a composition usable as a primer for improving the adhesion of silicone compositions, especially silicone gels, to polymeric adherends.

2. Description of Related Art

Gels have been used for a variety of applications, such as sealing, encapsulation, acoustic isolation or damping, insulation, and the like. Properties which make gels valuable in such applications include their conformability, adhesion to a wide variety of materials, and re-enterability. Typically, a gel is a high elongation, low modulus (soft) material. A preferred type of gel is a silicone gel.

Generally, gels have satisfactory adhesive strength to most adherends with which they come in contact. However, for certain polymers, such as polyphenylene oxide, polycarbonate, ABS/polycarbonate alloy, and polypropylene, it may be necessary or desirable to improve adhesion by employing a primer. (These polymers may be used for molded parts such as electrical connectors and terminations, which are then filled with silicone gel to provide environmental sealing around electrical connections within the part.) Illustrative disclosures relating to gel-containing electrical articles include Debbaut, U.S. Pat. No. 4,600,261 (1986); Debbaut, U.S. Pat. No. 4,634,207 (1987); Uken et al., U.S. Pat. No. 4,643,924 (1987); Uken et al., U.S. Pat. No. 4,662,692 (1987); Debruycker et al., U.S. Pat. No. 4,846,721 (1989); Shimirak et al., U.S. Pat. No. 5,069,636 (1991); Mattis et al., U.S. Pat. No. 5,153,988 (1992); Pinyan et al., U.S. Pat. No. 5,167,526 (1992); Mattis et al., U.S. Pat. No. 5,273,449 (1993); Roney et al., U.S. Pat. No. 5,347,084 (1994); Shimirak et al., U.S. Pat. No. 5,449,299 (1995); Shimirak et al., U.S. Pat. No. 5,601,460 (1997); and Huynh-Ba et al., U.S. Pat. No. 5,828,005 (1998).

We have found a commercially available primer which is technically suitable for polyphenylene oxide, but which is less effective with ABS/polycarbonate alloy and not effective at all with polypropylene. Further, the use of this primer is commercially undesirable because it is very costly and also because it contains as a carrier VM&P (varnish makers' and painters') naphtha, which is very flammable (flash point 40° F.) and somewhat toxic. Because of these hazardous properties, processing of the waste stream from manufacturing operations using this primer can be expensive.

In view of the foregoing, it is desirable to develop a primer for silicone gels which is superior to prior art primers in one or more of the foregoing respects, in particular being efficacious with a variety of polymers, having reduced flammability, and/or having reduced toxicity.

BRIEF SUMMARY OF THE INVENTION

We provide a composition comprising:
(a) between 0.125 and 2.5 weight percent of a first coupling agent which is
  (i) a titanium containing coupling agent selected from the group consisting of tetra-2-ethylhexyl titanate, tetra-n-butyl titanate, tetracresyl titanate, and tetramethoxypropoxy titanate;
  (ii) a boron-containing coupling agent selected from the group consisting of trimethoxyboroxine, triphenoxyboroxine, triphenyl borate, and tris (trimethylsiloxy) boron;
  (iii) a zirconium-containing coupling agent selected from the group consisting of zirconium tetra-2-ethylhexanoate, tetraphenoxy zirconate and tetra-2-ethylhexyl zirconate; or
  (iv) a combination of the aforesaid titanium-, boron-, and zirconium-containing coupling agents;
(b) between 0.125 and 2.5 weight percent of a second coupling agent which is a silane coupling agent selected from the group consisting of tris(3-(trimethoxysilyl)propyl)isocyanurate and N-phenyl-γ-aminopropyl-trimethoxysilane; and
(c) between 99.75 and 95.0 weight percent of a carrier solvent; the weight percent's being based on the combined weights of first and second coupling agent and carrier solvent.

In another aspect of the invention, we provide a method of bonding a crosslinked silicone composition to a polymer surface, comprising the steps of:
(I) providing an article having a polymer surface to which a crosslinked silicone resin is to be adhesively bonded;
(II) coating the polymer surface with a composition comprising
  (a) between 0.125 and 2.5 weight percent of a first coupling agent which is
    (i) a titanium containing coupling agent selected from the group consisting of tetra-2-ethylhexyl titanate, tetra-n-butyl titanate, tetracresyl titanate, and tetramethoxypropoxy titanate;
    (ii) a boron-containing coupling agent selected from the group consisting of trimethoxyboroxine, triphenoxyboroxine, triphenyl borate, and tris (trimethylsiloxy)boron;
    (iii) a zirconium-containing coupling agent selected from the group consisting of zirconium tetra-2-ethylhexanoate, tetraphenoxy zirconate and tetra-ethylhexyl zirconate; or
    (iv) a combination of the aforesaid titanium-, boron-, and zirconium-containing coupling agents;
  (b) between 0.125 and 2.5 weight percent of a second coupling agent which is a silane coupling agent selected from the group consisting of tris(3-(trimethoxysilyl)propyl)isocyanurate and N-phenyl-γ-aminopropyltrimethoxysilane; and
  (c) between 99.75 and 95.0 weight percent of a carrier solvent; the weight percent's being based on the combined weights of first and second coupling agent and carrier solvent;
(III) drying the composition;
(IV) applying onto the polymer surface an uncrosslinked silicone composition; and
(V) crosslinking the silicone composition to form an adhesive bond between crosslinked silicone composition and the polymer surface.

DETAILED DESCRIPTION OF THE INVENTION

We have found that, unexpectedly, there is a synergistic effect from the combination of the first and second coupling agents and the carrier solvent. It appears that the solvent affects the structure of the deposited coupling agents, in turn affecting the resulting bond strength between the silicone composition and the adherend. Further, the coupling agents are more effective in combination than individually. Generally, the synergistically effective combined total of the first and second coupling agents is between 0.25 and 5.0 weight %, with each coupling agent being present in an amount between 0.125 and 2.5 weight %. Preferably, each coupling agent is present in an amount of between 0.125 and 2.0 weight %. More preferably, each coupling agent is present in an amount of between 0.125 and 1.0 weight %. If the concentration of coupling agents is too low, there will be too few reactive groups for effective coupling. Conversely, if the concentration of coupling agents is too high, the reactive groups start stacking up on top of each other, reducing the bonding to the polymer substrate.

The titanium-containing first coupling agent is selected from those provided in Table A:

TABLE A

Titanium-Containing First Coupling Agents

| Name | Exemplary Supplier (Tradename/Product No.) |
|---|---|
| Tetra-2-ethylhexyl titanate | Du Pont (Tyzor TOT) |
| Tetra-n-butyl titanate | Du Pont (Tyzor TBT) |
| Tetracresyl titanate | Gelest (AKT 881) |
| Tetramethoxypropoxy titanate | Gelest (AKT 880.5) |

The boron-containing first coupling agent is selected from those provided in Table B:

TABLE B

Boron-Containing First Coupling Agents

| Name | Exemplary Supplier (Tradename/Product No.) |
|---|---|
| Trimethoxyboroxine | Callery (TMBX) |
| Triphenoxyboroxine | — |
| Triphenylborate | — |
| Tris(trimethylsiloxy)boron | Aldrich Chemical (Catalog No. 34,863-5) |

The zirconium-containing first coupling agent is selected from those provided in Table C.

TABLE C

Zirconium-Containing First Coupling Agents

| Name | Exemplary Supplier (Tradename/Product No.) |
|---|---|
| Tetraphenoxy zirconate | — |
| Zirconium tetra-2-ethylhexanoate | Gelest (CXZR 043) |
| Tetra-2-ethylhexyl zirconate (also known as zirconium tetra-2-ethylhexoxide) | Gelest (AKZ951) |

The second coupling agent is a silane coupling agent selected from those provided in Table D:

TABLE D

Second Coupling Agents

| Name | Exemplary Supplier (Tradename) |
|---|---|
| Tris(3-(trimethoxysilyl)propyl)isocyanurate | OSI (Y-11597) |
| N-phenyl-γ-aminopropyltrimethoxysilane | OSI (Y-9669) |

Suitable carrier solvents include 1-t-butoxy-2-propanol (hereinafter "PTB," also known as propylene glycol mono-t-butyl ether), 1-methoxy-2-propanol (hereinafter "PM," also known as propylene glycol mono-methyl ether), and 1-ethoxy-2-propanol (hereinafter "PE," also known as propylene glycol mono-ethyl ether). Generally, a carrier solvent is a solvent which carries another material which is deposited onto a surface when the solvent evaporates. Carrier solvents for alkoxides (which many coupling agents are) commonly are grouped into polar solvents that speed hydrolysis (e.g., water and lower molecular weight primary alcohols), polar solvents that slow hydrolysis (e.g., higher molecular weight primary alcohols, secondary alcohols, and glycol ethers), and non-polar solvents (e.g., aliphatic and aromatic hydrocarbons). Non-polar solvents should theoretically be the best from a stability point of view, because hydrolysis should not occur until the solvent has evaporated. In practice, most hydrocarbons absorb some moisture which causes rapid hydrolysis because there is no polar group present to slow the hydrolysis. In respect of our invention, we have found that specific glycol ethers work better than others in synergism with a combination of two or more coupling agents, one of which is a silane coupling agent. While there is no apparent technical advantage to using a mixture of the aforesaid carrier solvents compared to using a single solvent, the use of a mixture is also within the scope of our invention.

The composition of this invention is usable as a primer for certain polymers which otherwise do not bond well to silicone gels, such as polyphenylene oxide (e.g., Noryl™ resin from General Electric), polycarbonate (e.g., Lexam™ resin from General Electric, ABS/polycarbonate alloy (e.g., Cycoloy™ resin from General electric), and polypropylene (e.g., Aristech).

Preferably, the crosslinked silicone gel is a silicone gel based on polydimethylsilo-xane (PDMS) and prepared by the platinum-catalyzed reaction between a vinyl-functionalized PDMS and a hydride-functionalized PDMS. Such gels can be formed in a number of ways. One method synthesizes the crosslinked polymer in the presence of a non-reactive extender fluid, e.g. trimethylsiloxy-terminated PDMS. An alternative method fabricates the silicone gel by reacting a stoichiometric excess of a multifunctional vinyl-substituted silicone with a multifunctional hydride-substituted silicone in such a fashion that a soft, fluid-extended system is obtained. In the latter approach, a vinyl-rich sol fraction is obtained. Combination systems are possible. Suitable examples of either of these gel systems are taught in, inter alia, Debbaut, U.S. Pat. No. 4,600,261 (1986); Debbault, U.S. Pat. No. 4,634,207 (1987); Debbault, U.S. Pat. No. 5,357,057 (1994); Dubrow et al., U.S. Pat. No. 5,079,300 (1992); Dubrow et al., U.S. Pat. No. 4,777,063 (1988); and Nelson, U.S. Pat. No. 3,020,260 (1962); all incorporated herein by reference. Silicone gel systems based on alternative cure techniques such as peroxide, UV light, and high energy radiation may also be used.

Especially preferred are soft, tough, tacky, high elongation silicone gels that exhibit good stress relaxation and reduced fluid exudation. Exudation of extender fluid from the gel material (also referred to as fluid migration or bleed-out) is undesirable because it contaminates the surrounding environment with a thin liquid film.

A low-exudation silicone gel can be fabricated by the chain extension of a divinyl silicone material in the presence of a cross-linker and a chain extender to create a high molecular weight sol, such that the weight average molecular weight ($M_w$) of the extractable fluid is at least 100,000 g/mol. (The extractable fluid consists of the sol and nonreactive diluent present in the formulation, if any.) The gel material is preferably fabricated with 0 to 40 weight % added inert extender diluent. An alternative synthetic method is to use a diluent with $M_w$ of at least 100,000 g/mol, but then the initial (uncured) viscosity is greater than 50,000 cP, which may make filling the base more difficult. Generally, these silicone gels preferably have a hardness of 10 to 1,000 g (more preferably 10 to 500 g), a tack of 5 to 250 g, an ultimate elongation of greater than 500%, a stress relaxation 20 to 95%.

Although the composition of this invention was developed primarily as a primer for silicone gels (especially hydrosilation (Pt catalyzed) cured silicones), the similar cure chemistry of silicone gels and silicone rubbers makes us believe that the primer composition is also suitable for use with cured silicone rubbers and other cured (crosslinked) silicone compositions. While the invention has not been experimentally tested with condensation cured silicones, there is no a priori reason why it should not be utilizable with such silicones, also.

According to the method of this invention, the surface (preferably clean) of the polymer to which it is desired to establish a bond is coated with a thin layer of the primer composition of this invention, for example by brushing. The surface is allowed to dry (dryness being determined visually), the evaporation of the carrier solvent leaving behind a layer of coupling agents on the polymer surface. Uncrosslinked silicone composition is then applied to the polymer surface, and the silicone composition is crosslinked (cured). In the course of the crosslinking process, a strong adhesive bond between the silicone composition and the polymer surface. We have found that where silicone composition that is already substantially completed crosslinked is applied to the polymer surface, there is no improvement in adhesion.

The present invention is usable in a variety of applications. For instance, connectors or closure articles made of a polymer may be filled with a silicone gel for environmental protection of electrical contacts within the article. Good adhesion of the gel to the walls of the article is important for effective environmental sealing. Or, silicone gel may be carried on a tape, mesh, or other kind of polymeric support, again with good polymer-gel adhesion being important.

Adhesion strength is evaluated using a 180° peel or lap shear test. Briefly, 2.5 inch diameter by 0.040 inch thick disks are molded of the polymer to which adhesion is being tested. The disks are cleaned with an isopropanol wipe, coated with the primer solution, dried, and placed in a special fixture which forms a sandwich of disks with uncured silicone gel precursor in the center. The entire fixture is placed in an oven to cure the silicone gel. After curing and cooling, the disks are pulled in opposite directions in an Instron tester at 50.0 mm/min, and the maximum tensile force and the toughness are recorded. Although not optimized, the method is useful for comparative studies.

The practice of our invention is exemplified in the following tables, whose data is provided by means of illustration and not of limitation.

In each instance the silicone composition was a low viscosity, high-elongation, Pt-catalyzed hydrosilation cured silicone gel of the type used in Gelguard™ gel-filled RJ-11 connector products from Raychem Corporation.

Table I compares the effectiveness of different titanate-containing and/or silane coupling agents in formulations according to this invention against formulations not according to this invention. Each coupling agent was present in an amount of 1 weight %. The polymer tested was polyphenylene oxide (Noryl N190 from General Electric, a "gray" formulation containing a gray colorant compounded into the resin and obtained from Suttle Apparatus Corporation).

TABLE I

| Ex. | Coupling Agent(s) or Comparison | Carrier Solvent | Max. Load (lbs.) | Toughness (in-lb/in$^3$) |
|---|---|---|---|---|
| A | Tyzor TE[a,b] | 90/10 IPA/water | 1.8 | 12,800 |
| B | Tyzor TE[a] | PM | 1.8 | 23,800 |
| C | Tyzor LA[a,c] | water | 3.4 | 15,400 |
| D | (Cleaned Only)[a] | (none) | 10.4 | 34,400 |
| E | AKT 881[a] | Methoxy-propylacetate | 33.2 | 105,700 |
| F | Tyzor TOT[a] | PM | 34.3 | 113,500 |
| G | AKT 880.5[a] | Methoxy-propylacetate | 36.0 | 107,200 |
| H | Tyzor TOT[a] | Methoxy-propylacetate | 44.7 | 96,700 |
| I | Y-11597[a] | Methoxy-propylacetate | 45.5 | 133,100 |
| J | AKT 880.5[a] | PM | 49.9 | 162,100 |
| K | AKT 881[a] | PM | 50.4 | 132,300 |
| L | AKT 881/Y-11597 | PM | 60.7 | 173,900 |
| M | AKT 880.5/Y-11597 | PM | 75.0 | 164,700 |
| N | CF1-135[a,d] | VM&P Naphtha | 69.7 | 198,200 |
| O | Epoxy adhesive[a] | none | 78.9 | 94,300 |

[a]Comparative example not according to this invention
[b]Triethanolamine-n-butyl-titanate, available commercially from Du Pont
[c]Ammonium lactate titanate complex, available commercially from Du Pont
[d]Commercially available primer from Nusil Technologies The reader's attention is drawn to how the combination of a titanate-containing coupling agent and a silane coupling agent (examples I-L and I-M), in accordance with this invention, is especially effective, compared to either a titanate-containing coupling agent or a silane coupling agent alone.

Table II compares the effectiveness of various titanate/silane coupling agent ratios. The polymer substrate was as described with reference to Table I. The carrier solvent was PM.

TABLE II

| Ex. | Silane Coupling Agent Concentration | Titanate Coupling Agent Concentration | Max. Load (lbs.) | Toughness (in-lb/in$^3$) |
|---|---|---|---|---|
| A | 1% Y-11597 | 1% AKT-881 | 60.7 | 173,900 |
| B | 0.5% Y-11597 | 2% AKT-881 | 50.1 | 201,000 |
| C | 1% Y-11597 | 2% AKT-881 | 37.9 | 154,800 |
| D | 1% Y-11597 | 1% AKT-880.5 | 75.0 | 164,700 |
| E | 0.5% Y-11597 | 2% AKT-880.5 | 45.4 | 189,900 |
| F | 1% Y-11597 | 2% AKT-880.5 | 56.3 | 241,100 |
| G | 2% Y-11597 | 1% AKT-880.5 | 29.6 | 162,900 |

The results of Table II appear to show that an excessive amount of first or second coupling agent is may actually lead to a decrease in primer effectiveness: compare examples II-B, II-C, II-E, II-F, and II-G, each of which contains 2% of the titanate or silane coupling agent, against the other examples, in which the amount of each coupling agent is less.

Table III shows the effect of the carrier solvent the performance of coupling agents. The polymer was polyphenylene oxide (Noryl N190 from General Electric, an "ivory" containing an ivory-colored colorant compounded into the resin). The concentration of each first or second coupling agent was 1 weight %.

TABLE III

| Ex. Alkoxide | Carrier Solvent | Max. Load (lbs.) | Toughness (in-lb/in³) |
|---|---|---|---|
| Y-11597/AKT-881 | 1-Phenoxy-2-propanol[a] | 7.0 | 70,800 |
| Y-11597/AKT-881 | Dipropylene glycol methyl ether[a] | 27.0 | 116,500 |
| Y-11597/AKT-881 | PM | 35.6 | 192,400 |
| Y-11597/AKT-881 | PNB[a] | 36.0 | 174,000 |
| Y-11597/AKT-881 | R-(+)-Limonene[a] | 50.0 | 191,200 |
| Y-11597/AKT-881 | Butoxyethanol[a] | 51.2 | 147,000 |
| CF1-135 | Naphtha[a] | 67.7 | 203,100 |
| Y-11597/AKT-881 | VM&P Naphtha HT[a] | 71.2 | 236,000 |
| Y-11597/AKT-881 | 200 HT Mineral Spirits[a] | 71.8 | 252,900 |
| Y-11597/AKT-881 | Odorless Mineral Spirits[a] | 75.2 | 219,000 |
| Y-11597/AKT-881 | PTB | 75.5 | 198,800 |

[a] Comparative example not according to the invention

Table IV compares the effectiveness of primer systems having boron-containing and/or titanium-containing first coupling agents. The carrier solvent was PTB.

TABLE IV

| | Polyphenylene oxide (Ivory Noryl N190) | | Polycarbonate (Clear Lexan 143R) | | Polypropylene (Natural Aristech D115A) | |
|---|---|---|---|---|---|---|
| Primer | Max. Load (lbs.) | Toughness (in-lb/in³) | Max. Load (lbs.) | Toughness (in-lb/in³) | Max. Load (lbs.) | Toughness (in-lb/in³) |
| Cleaned only[a] | 12.5 | 32,790 | 9.2 | 31,800 | 8.1 | 23,000 |
| CF1-135[a] | 46.6 | 138,600 | 29.4 | 88,400 | 7.3 | 26,800 |
| 1% AKT881 1% Y11597 | 64.2 | 206,100 | 60.9 | 177,700 | 21.6 | 160,400 |
| 1% TMBX 1% Y11597 | 63.7 | 214,600 | 64.5 | 192,700 | 9.7 | 50,300 |
| 1% AKT881 1% TMBX | 24.5 | 124,100 | Na | na | na | na |

[a] Comparative example not according to the invention

Table V illustrates the effectiveness of primers of this invention for improving bonding to ABS/polycarbonate alloy (Cycoloy 2950, ivory colored). The concentration of each coupling agent was 1 weight %. The carrier solvent was in each instance PTB except in the instance of the comparative example with CF1-135, in which case the carrier solvent was naphtha.

TABLE V

| Ex. | Coupling Agents or Primer | Max. Load (lbs.) | Toughness (in-lb/in³) |
|---|---|---|---|
| A | A-1120 [a] and AKT-881 * | 31.1 | 86,800 |
| B | TRIAMO [b] and AKT-881 * | 35.6 | 93,100 |
| C | Y-9669 and AKT-881 | 64.4 | 139,200 |
| D | Y-11597 and AKT-881 | 83.6 | 210,000 |
| E | Y-11597 and Tyzor TOT | 89.2 | 226,800 |
| F | CF1-135 * | 90.2 | 224,900 |

* Comparative example not according to the invention
[a] N-β-(Aminoethyl)-γ-aminopropyltrimethoxysilane, available from OSI
[b] Triamino modified propyltrimethoxysilane, available from Huls Table VI shows the effectiveness of various primer compositions when applied to gray-colored Cycoloy 2950 ABS/polycarbonate. The carrier solvent was PTB. In addition to the first coupling agent indicated, 1 weight % Y-11597 was present as the second coupling agent.

TABLE VI

| Ex. | First Coupling Agent | Max. Load (lbs.) | Toughness (in-lb/in³) |
|---|---|---|---|
| A | Tetracresyltitanate | 83.5 | 301,900 |
| B | Tetra-2-ethylhexyltitanate | 72.1 | 233,500 |
| C | Tetra-n-butyltitanate | 53.0 | 205,200 |
| D | Tris(trimethylsiloxy)boron | 88.2 | 325,200 |
| E | Tetrakis(trimethylsiloxy)titanium [a] | 47.3 | 134,400 |
| F | Trimethoxyboroxine | 73.8 | 154,500 |
| G | Zirconium citrate, ammonium complex [a] | 22.6 | 68,200 |
| H | Zirconium tetra-2-ethylhexanoate | 71.0 | 227,800 |
| I | Tetra-2-ethylhexylzirconate | 60.0 | 206,200 |
| J | Tri-sec-butylaluminate [a] | 59.0 | 202,800 |

[a] Comparative example not according to the invention

Table VII compares the performance of boron-containing and titanium-containing first coupling agents. Each sample also included 1 weight % Y-11597 as the second coupling agent. The carrier solvent was PTB.

TABLE VII

| | ABS/ Polycarbonate alloy (Gray Cycoloy 2950) | | Polycarbonate (Clear Lexan 143R) | |
|---|---|---|---|---|
| First Coupling Agent(s) | Max. Load (lbs.) | Toughness (in-lb/in³) | Max. Load (lbs.) | Toughness (in-lb/in³) |
| 1% AKT 881 | 66.3 | 216,600 | 78.4 | 328,300 |
| 1% TTSB [a] | 83.9 | 260,500 | 31.3 | 110,800 |
| 0.5% TTSB plus 0.5% TMBX | 48.2 | 191,000 | 61.9 | 219,600 |
| 1.0% TTSB plus 1.0% TMBX [a] | 47.1 | 171,300 | 65.1 | 246,900 |

[a] TTSB = Tris(trimethylsiloxy)boron

Table VIII shows the effect of different solvents as the carrier solvent. The polymer was ABS/polycarbonate (Cycoloy 2950, ivory colored).

TABLE VIII

| Coupling Agent(s) | Carrier Solvent | Max. Load (lbs.) | Toughness (in-lb/in³) |
|---|---|---|---|
| Y-11597/AKT-881 | 1,2-Dimethoxyethane [a] | Dissolved resin | Dissolved resin |
| Y-11597/AKT-881 | Tetrahydrofurfuryl alcohol [a] | Dissolved resin | Dissolved resin |
| Y-11597/AKT-881 | n-Propoxypropanol [a] | 18.6 | 107,300 |
| Y-11597/AKT-881 | PNB [a] | 23.5 | 83,100 |
| Y-11597/AKT-881 | 3-Methoxy-1-butanol [a] | 41.2 | 141,500 |
| Y-11597/AKT-881 | Cyclohexanol [a] | 56.5 | 205,100 |
| CF1-135 | Decahydronaphthalene [a] | 67.1 | 255,100 |
| Y-11597/AKT-881 | n-Decane [a] | 84.4 | 207,600 |
| Y-11597/AKT-881 | PTB | 87.1 | 243,500 |

[a] Comparative example not according to the invention

Table IX documents the effect of the color additive in Cycoloy 2950 ABS/polycarbonate resin. Rather surprisingly, we discovered that the color additive can influence adhesion. The first and second coupling agents were AKT 881 and Y-11597, respectively, at 1 weight % concentration each. The carrier solvent was PTB.

TABLE IX

| Color | Max. Load (lbs.) | Toughness (in-lb/in$^3$) |
|---|---|---|
| Orange | 46.2 | 185,100 |
| Green | 51.9 | 219,000 |
| Black | 69.0 | 258100 |
| Yellow | 70.7 | 234,100 |
| Blue | 72.0 | 241,700 |
| White | 75.2 | 244,200 |
| Gray | 80.4 | 202,700 |
| Red | 81.9 | 228,800 |
| Ivory | 87.1 | 243,500 |

Table X provides the results of a study of the effect of elapsed time (from priming) on primer effectiveness. The first and second coupling agents were AKT 881 and Y-11597, respectively, each at 1 weight % concentration.

TABLE X

| Elapsed Time (Days) | Gray Cycoloy 2950 | | Black Cycoloy 2950 | | Ivory Cycoloy 2950 | |
|---|---|---|---|---|---|---|
| | Max. Load (lbs.) | Toughness (in-lb/in$^3$) | Max. Load (lbs.) | Toughness (in-lb/in$^3$) | Max. Load (lbs.) | Toughness (in-lb/in$^3$) |
| 1 | 83.9 | 260,500 | na | na | na | na |
| 3 | 83.8 | 237,700 | 89.4 | 265,200 | 69.0 | 223,100 |
| 4 | 91.4 | 250,100 | na | na | na | na |
| 5 | na | na | 91.2 | 280,800 | 66.0 | 212,800 |
| 7 | na | na | 87.1 | 289,900 | 90.9 | 278,500 |
| 8 | 82.9 | 247,800 | na | na | na | na |

The foregoing detailed description of the invention includes passages that are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure or embodiment, such feature can also be used, to the extent appropriate, in the context of another figure or embodiment, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. A composition comprising:
   (a) between 0.125 and 2.5 weight percent of a first coupling agent which is
      (i) a boron-containing coupling agent selected from the group consisting of trimethoxyboroxine, triphenoxyboroxine, triphenyl borate and tris(trimethylsiloxy)boron; or
      (ii) a combination of the aforesaid boron-containing coupling agent; and
         (1) a titanium containing coupling agent selected from the group consisting of tetra-2-ethylhexyl titanate, tetra-n-butyl titanate, tetracresyl titanate, and tetramethoxypropoxy titanate; and
         (2) a zirconium-containing coupling agent selected from the group consisting of zirconium tetra-2-ethylhexanoate, tetraphenoxy zirconate and tetra-2-ethylhexylzirconate;
   (b) between 0.125 and 2.5 weight percent of a second coupling agent which is a silane coupling agent selected from the group consisting of tris(3-(trimethoxysilyl)propyl)isocyanurate and N-phenyl-y-aminopropyltrimethoxysilane; and
   (c) between 99.75 and 95.0 weight percent of a carrier solvent; the weight percent being based on the combined weights of first and second coupling agent and carrier solvent.

2. A composition according to claim 1, wherein the silane coupling agent is N-phenyl-γ-aminopropyltrimethoxysilane.

3. A composition according to claim 1, wherein the carrier solvent is 1-t-butoxy-2-propanol.

4. A composition according to claim 1, wherein the carrier solvent is 1-ethoxy-2-propanol.

5. A composition according to claim 1, wherein the carrier solvent is 1-methoxy-2-propanol.

6. A composition comprising:
   (a) between 0.125 and 2.5 weight percent of a first coupling agent which is
      (i) a titanium containing coupling agent selected from the group consisting of tetra-2-ethylhexyl titanate, tetra-n-butyl titanate, tetracresyl titanate, and tetramethoxypropoxy titanate;
      (ii) a boron-containing coupling agent selected from the group consisting of trimethoxyboroxine, triphenoxyboroxine, triphenyl borate and tris(trimethylsiloxy)boron;
      (iii) a zirconium-containing coupling agent selected from the group consisting of zirconium tetra-2-ethylhexanoate, tetraphenoxy zirconate and tetra-2-ethylhexylzirconate; or
      (iv) a combination of the aforesaid titanium-, boron-, and zirconium-containing coupling agents;
   (b) between 0.125 and 2.5 weight percent of a second coupling agent which is a silane coupling agent which is tris(3-(trimethoxysilyl)-propyl)isocyanurate; and
   (c) between 99.75 and 95.0 weight percent of a carrier solvent;
   the weight percent being based on the combined weights of first and second coupling agent and carrier solvent.

7. A method of adhesively bonding a crosslinked silicone composition to a polymer surface, comprising the steps of:
   (I) providing an article having a polymer surface to which a crosslinked silicone resin is to be adhesively bonded;
   (II) coating the polymer surface with a composition comprising
      (a) between 0.125 and 2.5 weight percent of a first coupling agent which is
         (i) a boron-containing coupling agent selected from the group consisting of trimethoxyboroxine, triphenoxyboroxine, triphenyl borate and tris(trimethylsiloxy)boron; or
         (ii) a combination of the aforesaid boron-containing coupling agent; and
            (1) a titanium containing coupling agent selected from the group consisting of tetra-2-ethylhexyl titanate, tetra-n-butyl titanate, tetracresyl titanate, and tetramethoxypropoxy titanate; and
            (2) a zirconium-containing coupling agent selected from the group consisting of zirconium tetra-2-ethylhexanoate, tetraphenoxy zirconate and tetra-2-ethylhexyl zirconate;

(b) between 0.125 and 2.5 weight percent of a second coupling agent which is a silane coupling agent selected from the group consisting of tris(3-(trimethoxysilyl)propyl)isocyanurate and N-phenyl-γ-aminopropyltrimethoxysilane; and (c) between 99.75 and 95.0 weight percent of a carrier solvent; the weight percent being based on the combined weights of first and second coupling agent and carrier solvent;

(III) drying the composition; (IV) applying onto the polymer surface an uncrosslinked silicone composition; and (V) crosslinking the silicone composition to form an adhesive bond between crosslinked silicone composition and the polymer surface.

8. A method according to claim 7, wherein the silane coupling agent is N-phenyl-γ-aminopropyltrimethoxysilane.

9. A method according to claim 7, wherein the carrier solvent is 1-t-butoxy-2-propanol.

10. A method according to claim 7, wherein the carrier solvent is 1-methoxy-2-propanol.

11. A method according to claim 7, wherein the carrier solvent is 1-ethoxy-2-propanol.

12. A method according to claim 7, wherein the crosslinked silicone composition is a silicone gel.

13. A method according to claim 12, wherein the silicone gel is a hydrosilation cured silicone gel.

14. A method according to claim 7, wherein the polymer is selected from the group consisting of polyphenylene oxide, polycarbonate, ABS/polycarbonate alloy, and polypropylene.

15. A method of adhesively bonding a crosslinked silicone composition to a polymer surface, comprising the steps of:

(I) providing an article having a polymer surface to which a crosslinked silicone resin is to be adhesively bonded;

(II) coating the polymer surface with a composition comprising (a) between 0.125 and 2.5 weight percent of a first coupling agent which is
  (i) a titanium containing coupling agent selected from the group consisting of tetra-2-ethylhexyl titanate, tetra-n-butyl titanate, tetracresyl titanate, and tetramethoxypropoxy titanate;
  (ii) a boron-containing coupling agent selected from the group consisting of trimethoxyboroxine, triphenoxyboroxine, triphenyl borate and tris(trimethylsiloxy) boron;
  (iii) a zirconium-containing coupling agent selected from the group consisting of zirconium tetra-2-ethylhexanoate, tetraphenoxy zirconate and tetra-2-ethylhexyl zirconate; and
  (iv) combinations of the aforesaid titanium-, boron-, and zirconium-containing coupling agents;

(b) between 0.125 and 2.5 weight percent of a second coupling agent which is a silane coupling agent which is tris(3-(trimethoxysilyl)propyl) isocyanurate; and (c) between 99.75 and 95.0 weight percent of a carrier solvent; the weight percent being based on the combined weights of first and second coupling agent and carrier solvent;

(III) drying the composition;

(IV) applying onto the polymer surface an uncrosslinked silicone composition; and (V) crosslinking the silicone composition to form an adhesive bond between crosslinked silicone composition and the polymer surface.

\* \* \* \* \*